March 27, 1934.   R. L. TRANSTROM   1,952,519
STEREOSCOPIC CAMERA
Filed March 31, 1931   3 Sheets-Sheet 1

INVENTOR.
ROBERT L. TRANSTROM
BY Alan Franklin
ATTORNEY

March 27, 1934.   R. L. TRANSTROM   1,952,519
STEREOSCOPIC CAMERA
Filed March 31, 1931   3 Sheets-Sheet 2

INVENTOR.
ROBERT L. TRANSTROM
BY Alan Franklin
ATTORNEY

March 27, 1934.  R. L. TRANSTROM  1,952,519
STEREOSCOPIC CAMERA
Filed March 31, 1931  3 Sheets-Sheet 3
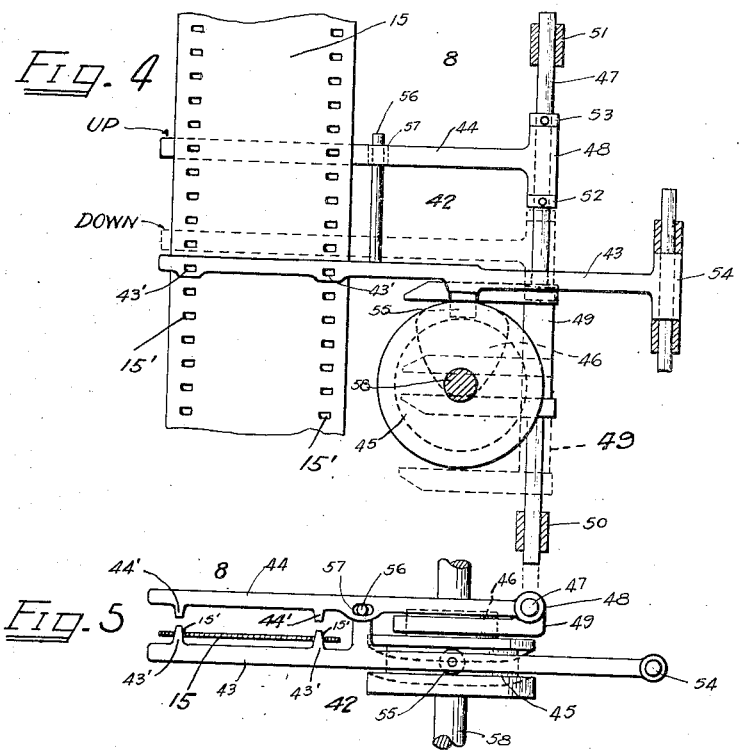
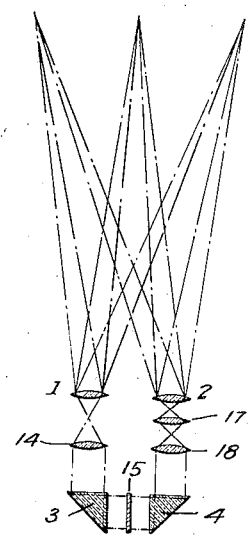
INVENTOR.
ROBERT L. TRANSTROM
BY
Alan Franklin
ATTORNEY Patented Mar. 27, 1934

1,952,519

UNITED STATES PATENT OFFICE 1,952,519

STEREOSCOPIC CAMERA

Robert L. Transtrom, Los Angeles, Calif.

Application March 31, 1931, Serial No. 526,601

3 Claims. (Cl. 88—16.6)

This invention relates to photography, and more particularly to a stereoscopic camera. My invention is applicable either to motion picture cameras or still cameras.

The general object of the invention is to provide a camera which will photograph an object from different view points in registration upon upon a single film for producing a stereoscopic picture.

A more particular object is to provide a camera of the character stated which will be simple in construction and efficient in operation.

A further object is to provide a new process of photographing stereoscopic pictures.

Other objects will appear hereinafter.

The invention is illustrated in the annexed drawings which form a part of this specification and in which, Fig. 1 is a front elevation of a camera embodying my invention.

Fig. 4 is a side elevation of the film movement mechanism.

Fig. 5 is a plan view of the film movement mechanism.

Fig. 6 is a diagram illustrating my invention.

Fig. 7 is a cross section of one form of film employed in my invention.

Fig. 8 is a cross section of another form of film employed in my invention.

Corresponding parts are designated by the same reference characters in all the figures.

Figure 1:
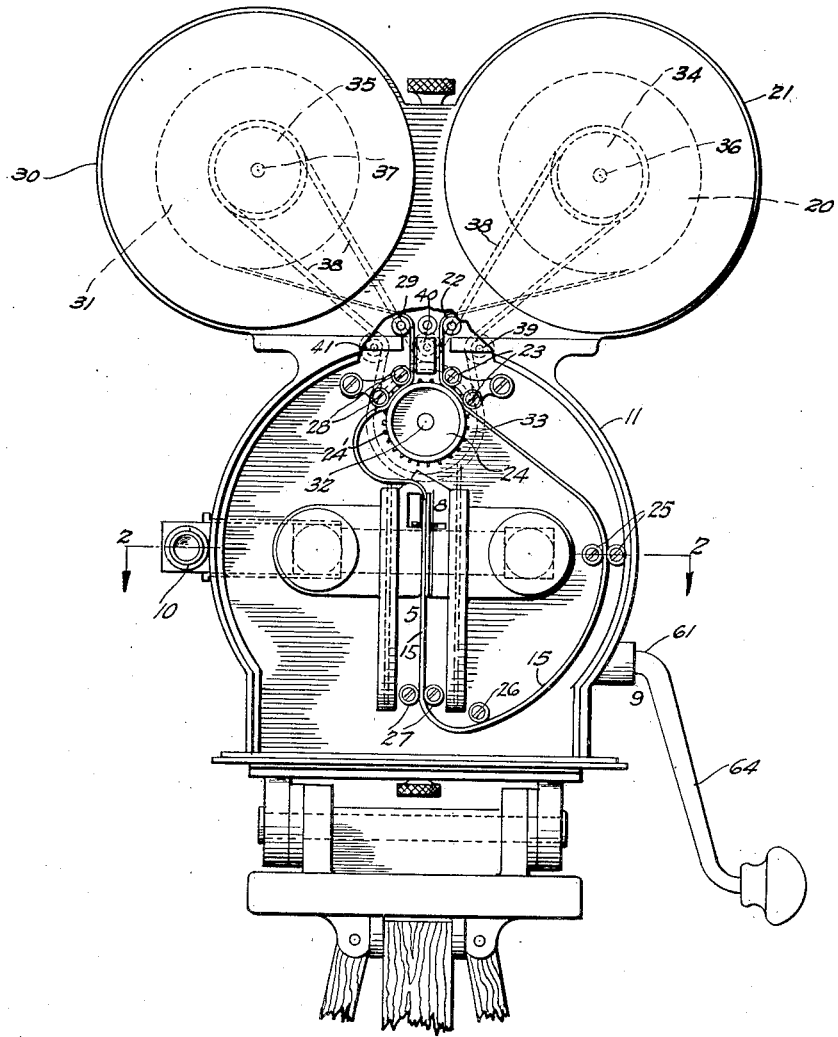

My invention is illustrated in the drawings as applied to a motion picture camera, which comprises primarily a pair of objectives 1 and 2, reflecting prisms 3 and 4, a film guide frame 5, shutters 6 and 7, a film movement mechanism 8, operating mechanism 9, and a viewfinder 10, all of which elements are mounted in a camera housing 11 with the film frame 5 between the reflecting prisms 3 and 4.

The objectives 1 and 2 are respectively mounted in the outer end of barrels 12 and 13, which barrels are mounted in the camera housing 11. In the barrel 12 is mounted a lens 14 for collecting the image from the objective 1 and transmitting the image through the barrel to the reflecting prism 3, which in turn reflects the image to the film 15 through an exposing aperture 16 in the film guide frame 5. In the barrel 13 is mounted a lens 17, and a reversing lens 18, the function of the lens 17 being to collect the image from the objective 2, and transmit the image to the reversing lens 18, and the function of the reversing lens 18 being to reverse the image and transmit it to the prism 4 which in turn reflects the reverse image through an exposing aperture 19 in the film guide frame 5 to the opposite side of the film 15 to which the image is reflected by the prism 3 from the objective 1, so that the photographed image received through the objective 2 will register perfectly with the photographed image received through the objective 1 and produce a stereoscopic picture on the film.

The film 15 is wound at one end in a roll 20 in a magazine 21 on the camera housing 11, and the film extends from said roll over a guide roller 22, between two guide rollers 23 and a film feed and take-up sprocket 24, between guide rollers 25, over a guide roller 26, between a pair of guide rollers 27, through the film guide frame 5, between a pair of guide rollers 28, and the sprocket 24, over a guide roller 29, and into a magazine 30 in which the film is wound on a take-up roll 31. The teeth 24' of the feed and take-up sprocket 24 engage perforations 15' along the edges of the film 15 for advancing the film. The feed and take-up sprocket 24 is secured on a shaft 32 on which is also secured a pulley 33. Pulleys 34 and 35 are secured on the shafts 36 and 37 respectively on which the film rolls 20 and 31 are respectively wound. A belt 38 extends over the pulleys 33, 34, and 35 and over sheaves 39, 40, and 41, whereby the feed and take-up sprocket 24, and the film roll shafts 36 and 37 are rotated in unison, for unwinding the film from the roll 20 and winding the film upon the roll 31.

The film movement mechanism includes the film-feed and take-up sprocket 24, and a shuttle mechanism 42. The shuttle mechanism 42 comprises a pair of shuttle bars 43 and 44, a pair of cams 45 and 46, a cam rod 47 on which the shuttle bar 44 is pivotally mounted at 48, and a cam-engaging fork 49, on said rod for engaging the lower and upper portions of the cam 46 for vertically reciprocating said rod 47, which rod is slidably mounted in bearings 50 and 51. Collars 52 and 53 are secured on the rod 47 which engage the ends respectively of the pivot knuckle 48 of shuttle bar 44 for holding said bar against longitudinal displacement on said rod. The shuttle bar 43 is pivoted at 54 and carries a roller 55 for engaging the cam 45. The shuttle bar 43 carries a pair of pilot pins 43' for engaging the perforations 15' in the film 15 for holding the film stationary momentarily before the exposing apertures 16 and 19 to expose the film for photographing. On the shuttle bar 43 is formed an upstanding pin 56 which extends through an eye 57 in the shuttle bar 44 for holding the shuttle bars 43 and 44 spaced apart transversely at a predetermined distance, while allowing the bar 44 to be moved up and down with relation to the bar 43 by the cam 46. The shuttle bar 44 carries a pair of engaging pins 44' for engaging the film perforations 15' when the pilot pins 43' are withdrawn therefrom, for intermittently advancing the film. The cams 45 and 46 are secured on a shaft 58 which is journaled in bearings 59 and 60 in the camera housing 11 and carries also the shutters 6 and 7, the shutter 6 being interposed between the objective 1 and the film exposing aperture 16 and the shutter 7 being interposed between the objective 2 and the film exposing aperture 19.

The operating mechanism 9 comprises a crank shaft 61, journaled in bearings 62 and 63 in the camera housing, a crank 64 on said crank shaft, the shaft 58, intermeshing gears 65 and 66 on the crank shaft 61 and shaft 58 respectively, a vertical shaft 67 journaled in bearings 68 and 69 in the camera housing 11, intermeshing worm gears 70 and 71 on said shafts 58 and 67 respectively, and an intermeshing worm 72 and worm gear 73 on the vertical shaft 67 and the film feed sprocket shaft 32 respectively.

Figure 2:
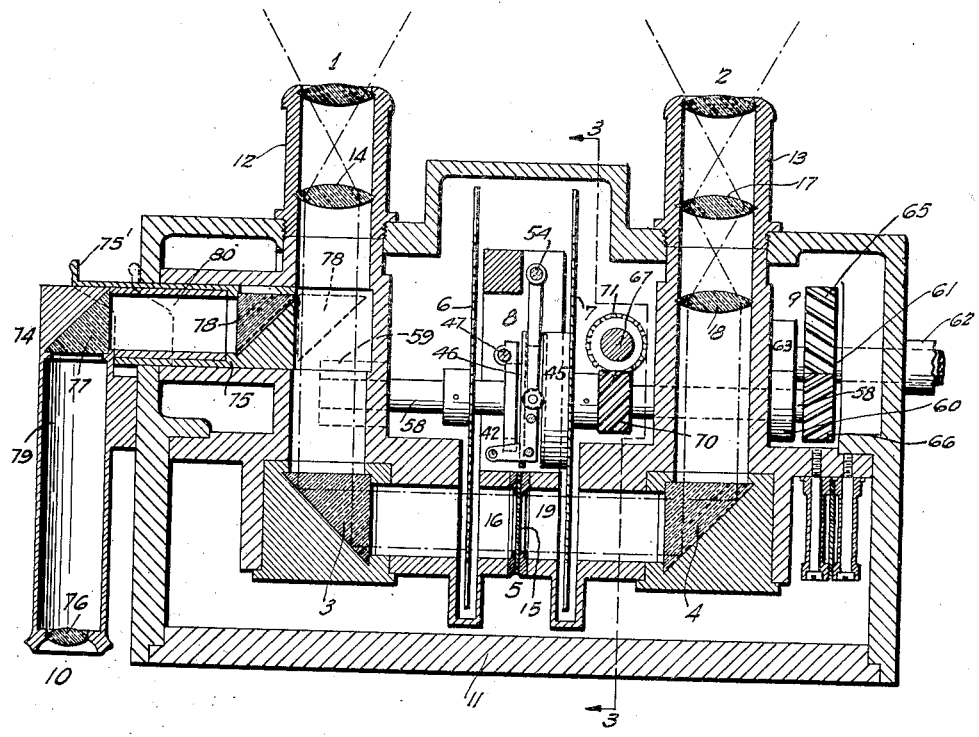
Fig. 2 is a horizontal section of Fig. 1 taken on line 2—2.
Figure 3:
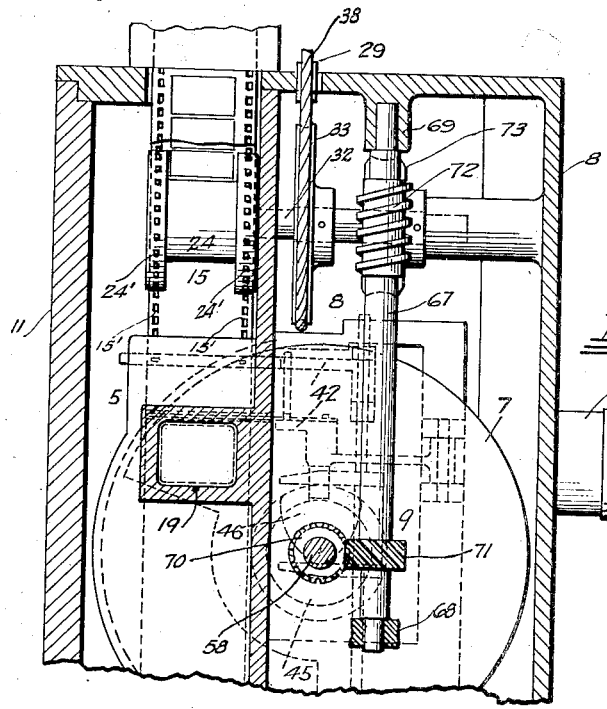
Fig. 3 is a transverse vertical section taken on line 3—3 of Fig. 2.

The viewfinder 10 comprises a barrel 74 a barrel sleeve 75, a sight lens 76 and prisms 77 and 78. The barrel 74 is formed with two members 79 and 80, the member 80 extending at right angles to the member 79 and into the camera housing 11. The lens 76 is mounted in the rear end of the barrel member 79. The prism 77 is mounted in the barrel 74 in the angle between the members 79 and 80 of the barrel. The prism 78 is mounted in the inner end of the barrel sleeve 75 and said sleeve is slidably fitted on the barrel member 80 so that the sleeve may be moved inwardly until its inner end and the prism 78 are within the barrel 12 in position to receive the image from the objective 1 and reflect said image through the barrel member 80 to the prism 77 which in turn reflects the image through the barrel member 79 and lens 76 to the eye of the observer. The sleeve 75 is formed with a handle 75' which extends through the wall of the camera housing 11 to be gripped by the operator to move the sleeve 75 inwardly or outwardly, so that the prism 78 will be moved into the barrel 12 to receive the image from the objective 1, as shown in dotted lines in Fig. 2 or moved out of the barrel, as shown in full lines in said figure, to enable the objective 1 to project the image through the barrel 12 on to the prism 3 which reflects the image through aperture 16 upon the film 15 whereby the image is photographed on the film.

In the practice of my invention a film 15 with one side only sensitized, as indicated at 81, or a film 82 with both sides sensitized, as indicated at 83 and 84 may be used.

In the use of film 15 the images of both objectives are photographed on the sensitized side 81 of the film.

In the use of the film 82 the image of the objective 1 is photographed on the sensitized side 83 while the image of the objective 2 is photographed on the sensitized side 84 of the film.

The operation of my invention is as follows:
The objectives 1 and 2 of the camera being focused on the object to be photographed, the photographer turns the crank 64, which rotates the crank shaft 61 and through the medium of gears 65 and 66, and shaft 58 rotates the shutters 6 and 7, while the film movement 8 is operated by the rotation of the cams 45 and 46 by shaft 58 and by the rotation of the film-feed and take-up sprocket 24 from the shaft 58 through the medium of worm gears 70 and 71, the worm 72 and worm gear 73 and the shaft 32. During the periods of rest in the intermitted movement of the film 15 the image of the objective 1 is photographed on the film through the exposing aperture 16, while the image of the objective 2 is photographed on the film through the aperture 19 in registration with the image of objective 1 photographed through aperture 16 whereby a stereoscopic picture of the object is photographed on the film.

My film movement mechanism operates as follows:

The cam 45 engaging roller 55 swings the shuttle bar 43 so that the pilot pins 43' either engage a pair of the film perforations 15' or withdraw from said perforations. The pilot pins 43' engage said perforations to center the film with relation to the exposing apertures 16 and 19 and hold the film stationary while the shutters 6 and 7 uncover said openings to photograph the object on the film. When the pilot pins 43' are withdrawn from the film apertures 15' the swinging movement of the shuttle bar 43, by means of its pin 56 engaging the eye 57 of shuttle bar 44, swings the shuttle bar 44 inwardly so that its engaging pins 44' engage the film apertures 15' whereupon the engagement of cam 46 with fork 49 raises the rod 47, shuttle bar 44 and the film 15 the height of one picture so that the next portion of the film is brought into register with the exposing apertures 16 and 19 for photographing the next picture of the object on the film. The cam 45 then swings the shuttle bar 43 inwardly, so that the pilot pins 43' engage the film apertures 15' while the pin 56 of said bar engaging the eye 57 of shuttle bar 44 swings the bar 44 outwardly until its engaging pins 44' withdraw from the film perforations 15', whereupon the cam 46 through fork 49 and rod 47 lowers the shuttle bar 44 into position for advancing the film the next step of its intermittent movement.

I claim as my invention:

1. In a motion picture camera, a film guide frame provided with oppositely disposed openings through which opposite sides of the film are respectively exposed, a pair of objectives for collecting the image, means for transmitting the image from said objectives through said exposure openings respectively to the film and in registration on the film, means for intermittently advancing the film through said film guide frame, a pair of shutters for uncovering said exposure openings respectively when the film is at rest, and for covering said openings respectively when the film is advanced and a single shaft on which said shutters are secured and on which two cams of the film-advancing means are secured.

2. In a motion picture camera, a film guide frame, a film movement mechanism for intermittently advancing a film, sensitized on both sides, through said guide frame, a pair of objectives to be focused upon an object from different viewpoints respectively, a lens for collecting the image of the object from one of said objectives and transmitting said image, a prism for receiving the transmitted image from said lens and reflecting the image upon one side of said film, another lens for collecting the image from the other objective and transmitting said image, a reversing lens between said other objective and said other lens for reversing the image, another prism for receiving the reversed image from said other lens and reflecting said reversed image upon the other side of said film in registration with the image reflected on the opposite side of the film, and shutter means for uncovering both sides of the film in said guide frame, when the film is at rest, and for covering both sides of the film in said guide frame, when the film is advanced.

3. In a motion picture camera as characterized by claim 2, a view finder including means for inserting the finder between one of said objectives and one of said prisms, for viewing an object to be photographed, and for withdrawing the finder from between said objective and said prism for photographing an object.

ROBERT L. TRANSTROM.